United States Patent
Kaneko

(10) Patent No.: US 9,840,052 B2
(45) Date of Patent: Dec. 12, 2017

(54) MOLDING ELEMENT HAVING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (FR)

(72) Inventor: Shuichi Kaneko, Tokyo (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 0 days.

(21) Appl. No.: 15/105,139

(22) PCT Filed: Oct. 15, 2014

(86) PCT No.: PCT/EP2014/072135
§ 371 (c)(1),
(2) Date: Jun. 16, 2016

(87) PCT Pub. No.: WO2015/090672
PCT Pub. Date: Jun. 25, 2015

(65) Prior Publication Data
US 2016/0303813 A1 Oct. 20, 2016

(30) Foreign Application Priority Data
Dec. 17, 2013 (FR) ..................... 13 62803

(51) Int. Cl.
*B29D 30/06* (2006.01)
*B29C 33/42* (2006.01)

(52) U.S. Cl.
CPC .......... *B29D 30/0662* (2013.01); *B29C 33/42* (2013.01); *B29D 30/0606* (2013.01);
(Continued)

(58) Field of Classification Search
CPC ........ B29D 30/0606; B29D 2030/0612; B29D 2030/0613
See application file for complete search history.

(56) References Cited

U.S. PATENT DOCUMENTS 3,415,923 A * 12/1968 Petersen ............ B29D 30/0606
164/10
3,432,888 A * 3/1969 Brierley ............. B29D 30/0606
425/28.1

(Continued)

FOREIGN PATENT DOCUMENTS

| DE | 197 30 068 A1 | 2/1999 |
|---|---|---|
| WO | 2012/087626 A2 | 6/2012 |
| WO | 2013/087826 A1 | 6/2013 |

*Primary Examiner* — James Mackey
(74) *Attorney, Agent, or Firm* — Dickinson Wright PLLC

(57) ABSTRACT

The disclosure relates to a molding element including a main lamella and two ribs positioned on either side of the main lamella at a certain distance from this main lamella. The ribs are mold-able to grooves in the tread, these ribs including rounded ends. The main lamella includes a cutting edge, the cutting edge making an acute angle. The ribs are curved in their length with a curvature C and in that the lamella is curved with the same curvature C.

3 Claims, 1 Drawing Sheet

(52) U.S. Cl.
CPC ............... *B29D 2030/0612* (2013.01); *B29D 2030/0613* (2013.01)

(56) References Cited

U.S. PATENT DOCUMENTS

| | | |
|---|---|---|
| 3,570,571 A | 3/1971 | Riches |
| 4,057,089 A | 11/1977 | Johannsen |
| 6,202,725 B1 * | 3/2001 | Moriya ................... B60C 11/12 152/209.23 |
| 6,408,911 B1 * | 6/2002 | Tanabe ............... B29D 30/0606 152/209.18 |
| 6,892,775 B1 | 5/2005 | Himuro |
| 9,126,377 B2 * | 9/2015 | Duvernier .......... B29D 30/0606 |

* cited by examiner

MOLDING ELEMENT HAVING CUTTING MEANS FOR MOLDING AND VULCANIZING A TIRE TREAD

CROSS-REFERENCE TO RELATED APPLICATIONS

This application is a 371 national phase entry of PCT/EP2014/072135, filed 15 Oct. 2014, which claims the benefit of French Patent Application No. 1362803, filed 17 Dec. 2013, the contents of which are incorporated herein by reference for all purposes.

BACKGROUND

The present invention relates to the field of molds for molding and vulcanizing a tire tread. More specifically, the invention relates to the molds used for molding in the tread grooves which are partially or completely covered by an additional cover layer.

Document U.S. Pat. No. 4,057,089 discloses a pneumatic tire comprising a tread band. The tread band has a plurality of blocks. Each block extends in a curved manner to one side of the tread band towards the center of this tread band. More particularly, the blocks are curved along structural curvature of a parabola of the second order.

Document WO2012087826 discloses a molding element of a mold for molding and vulcanizing a tire tread. The molding element comprises a molding surface intended to mold part of the tire tread surface and a rib intended to mold a groove in the tread. In addition, the molding element comprises two lamellas positioned on either side of the rib at a certain distance from this rib, each lamella comprising a cutting edge, this cutting edge making an acute angle. The cutting means are able to cut a cover layer that covers a green tire. The rib itself will mold a groove in the tread and at the same time guide part of the cover layer into the groove thus molded.

It is an object of the present invention to propose a mold for molding curved blocks with cover layer.

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "molding surface" of a molding element means the surface of the mold that is intended to mold the surface of the tire tread.

A "rib" of a molding element means a protrusion projecting from the molding surface. The width of the rib is 2 mm or more.

A "lamella" of a molding element means a protrusion projecting from the molding surface. The width of the lamella is less than 2 mm.

A "rib with a rounded end" means that the end of the rib is domed.

An "acute angle" means an angle smaller than 90°.

SUMMARY

The invention relates to a molding element comprising a main lamella and two ribs positioned on either side of the main lamella at a certain distance from this main lamella. The ribs are intended to mold grooves in the tread, this ribs comprising rounded ends. The main lamella comprises cutting edge, this cutting edge making an acute angle. The ribs are curved in their length with a curvature C and in that the lamella is curved with the same curvature C.

Thus, it is possible to mold curved blocks with cover layer in an easy manner.

In a variant, the molding element comprises a plurality of secondary lamellas. Each of these secondary lamellas comprises a cutting edge and in that the secondary lamellas extend globally perpendicularly to the main lamella.

We make easier the positioning of the cover layer on the walls of the groove molded by the rib. Indeed, we avoid the presence of a part of the cover layer over the surface contact of the block, since the cover layer is well adapting with the curved form of the block.

In a variant, the pitch between the plurality of secondary lamellas is globally equal along the main lamella.

We improve the cutting of the cover layer.

BRIEF DESCRIPTION OF THE DRAWINGS

Other features and advantages of the invention will emerge from the following description, given by way of nonlimiting example, with reference to the attached drawings in which.

DETAILED DESCRIPTION

In the description that follows, elements that are substantially identical or similar will be denoted by identical references.

Figure 1:
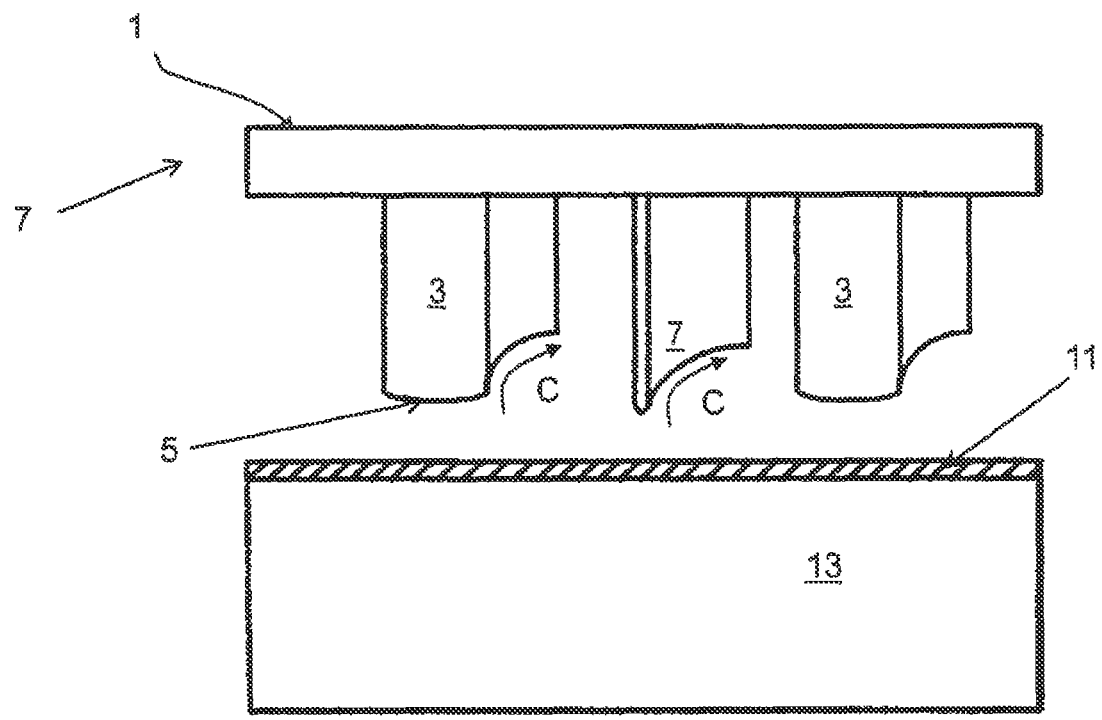
FIG. 1 schematically depicts a molding element according to the invention.

FIG. 1 depicts a molding element 1 according to the invention. The molding element 1 comprises one main lamella 7 and two ribs 3 positioned on either side of the main lamella 7 at a certain distance from this main lamella 7. The main lamella 7 comprises cutting edge making an acute angle. The cutting edge is able to cut a cover layer 11 that covers a green tire 13. In a preferred embodiment, the acute angle is lower than or equal to 60°. In a variant, the acute angle is lower than or equal to 35°. In other variant, the acute angle is lower than or equal to 20°. Each rib 3 comprises a rounded end. This rib will mold a groove in the tread and at the same time guide part of the cover layer into this groove thus molded.

More particularly, each rib 3 is curved in its length with a curvature C and the main lamella 7 is curved with the same curvature C.

Figure 2:
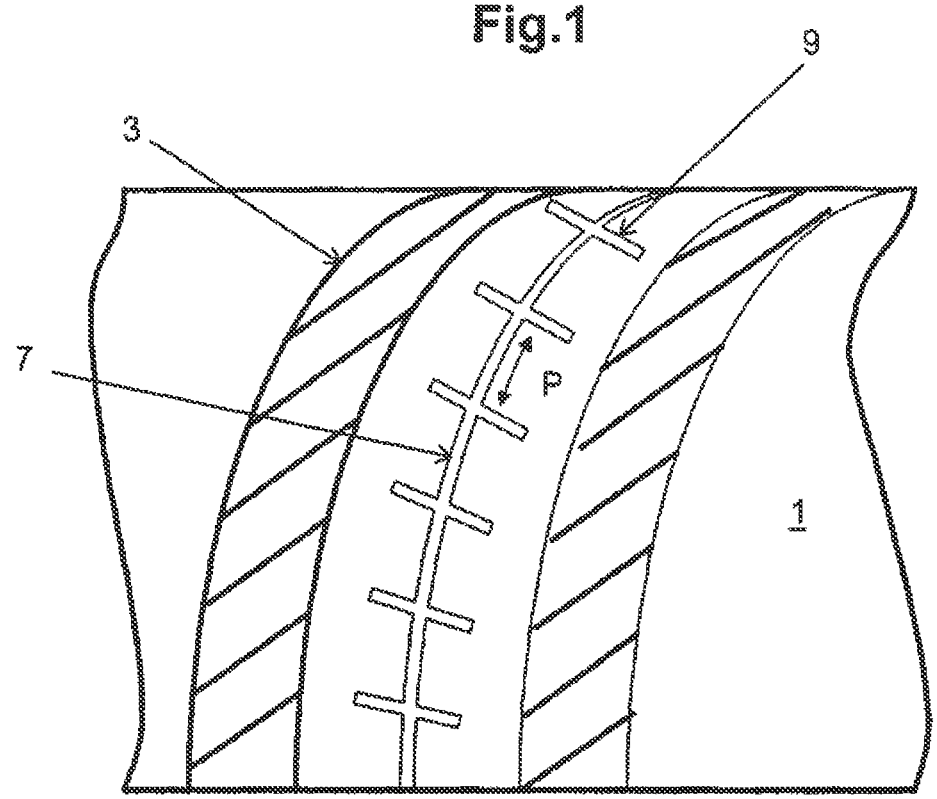
FIG. 2 illustrates a second embodiment of the molding element of the FIG. 1.

FIG. 2 illustrates a second embodiment in which the molding element 1 comprises a plurality of secondary lamellas. This secondary lamellas extend globally perpendicularly to the main lamella 7. Each of these secondary lamellas comprises a cutting edge for cutting the cover layer. Indeed, the pitch between the plurality of secondary lamellas is globally equal along the main lamella 7.

The invention is not restricted to the examples described and depicted and various modifications can be made thereto without departing from its scope.

The invention claimed is:

1. A molding element of a mold for molding and vulcanizing a tire tread, comprising:
    a main lamella and two ribs positioned on either side of the main lamella at a certain distance from this main lamella, the ribs being mold-able to grooves in the tread, the ribs including rounded ends,
    the main lamella having a cutting edge, the cutting edge making an acute angle,
    wherein the ribs are curved in their length with a curvature C and in that the main lamella is curved with the same curvature C,
    the molding element includes a plurality of secondary lamellas, each of these secondary lamellas including a cutting edge and in that the secondary lamellas extend globally perpendicularly to the main lamella, the plurality of secondary lamellas are connected with the main lamella in their median location, the plurality of secondary lamellas are globally equally spaced apart along the main lamella, and
    at least one of the plurality of secondary lamellas are at a different angle from at least another one of the plurality of secondary lamellas relative to the circumference of the tire.

2. The molding element according to claim 1, wherein the pitch (P) between the plurality of secondary lamellas is globally equal along the main lamella.

3. The molding element according to claim 1, wherein a variation of placement of the secondary lamellae follows both a curved pattern of the main lamellae and a maintenance of perpendicularity with the main lamellae.

\* \* \* \* \*